(12) United States Patent
Uemura et al.

(10) Patent No.: US 7,905,080 B2
(45) Date of Patent: Mar. 15, 2011

(54) GRASS COLLECTOR FOR A MOWER

(75) Inventors: Katsuhiko Uemura, Osaka (JP); Nobuyuki Yamashita, Osaka (JP); Kazuaki Kurohara, Osaka (JP); Hiroki Nagai, Osaka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/493,327

(22) Filed: Jun. 29, 2009

(65) Prior Publication Data

US 2009/0260339 A1 Oct. 22, 2009

Related U.S. Application Data

(63) Continuation of application No. 11/508,122, filed on Aug. 22, 2006, now Pat. No. 7,565,790.

(30) Foreign Application Priority Data

| Sep. 13, 2005 | (JP) | 2005-265335 |
| Sep. 13, 2005 | (JP) | 2005-265336 |
| Sep. 13, 2005 | (JP) | 2005-265337 |

(51) Int. Cl.
*A01D 34/00* (2006.01)

(52) U.S. Cl. .............. 56/203; 56/202; 56/205

(58) Field of Classification Search .......... 56/194, 56/202–206
See application file for complete search history.

(56) References Cited

U.S. PATENT DOCUMENTS

| 3,513,312 A | 5/1970 | Weiner |
| 3,753,340 A | 8/1973 | Mathews |
| 4,015,406 A | 4/1977 | Witt et al. |
| 6,012,273 A | 1/2000 | Ogasawara et al. |
| 6,050,072 A | 4/2000 | Chabrier et al. |
| 6,591,596 B2 | 7/2003 | Mauzizio et al. |
| 6,595,737 B1 | 7/2003 | Parish |
| 6,672,043 B2 | 1/2004 | Shibata et al. |
| 6,766,633 B2 | 7/2004 | Wanie et al. |
| 6,931,827 B2 | 8/2005 | Komorida et al. |
| 7,124,563 B2 | 10/2006 | Shibata et al. |
| 7,219,489 B2 * | 5/2007 | Tada et al. ............ 56/202 |

FOREIGN PATENT DOCUMENTS

| EP | 0754402 A1 | 1/1997 |
| JP | 61092245 | 6/1985 |
| JP | 03035717 A | 2/1991 |
| JP | 03065108 A | 3/1991 |
| JP | 03043948 B | 9/1991 |
| JP | 515224 | 1/1993 |
| JP | 05328820 | 12/1993 |
| JP | 06169625 | 6/1994 |
| JP | 7250530 A | 10/1995 |
| JP | 2001045829 | 2/2001 |
| JP | 2002238323 | 8/2002 |
| JP | 2004105108 | 4/2004 |

* cited by examiner

*Primary Examiner* — Alicia M Torres
(74) *Attorney, Agent, or Firm* — The Webb Law Firm (57) ABSTRACT

A grass collector adapted to be attached to a rear of a riding-type mower for receiving cut grass from a mower unit through a duct, the grass collector including a front container section having a rearwardly facing opening and adapted to be attached to the riding-type mower, the front container section carrying a first bottom plate having a substantially horizontal position. A rear container section is supported pivotably about a pivot point located in a rear upper region of the front container section and pivotable between a first position wherein the rear container section substantially covers the opening of the front container section and a second position pivoted from the first position to allow cut grass to fall, the rear container section having a second bottom plate having a substantially horizontal position.

9 Claims, 10 Drawing Sheets

GRASS COLLECTOR FOR A MOWER

This application claims priority from and is a continuation of U.S. patent application Ser. No. 11/508,122 filed on Aug. 22, 2006, now assigned U.S. Pat. No. 7,565,790. In a conventional art, a grass collector for a mower has a front container section that opened rearwardly and a rear container section that opened forwardly where the front container section is fixed to the vehicle side. The rear container section is pivotably supported about a pivot point located in an upper rear portion of the front container section. (See for example, JP5-15224).

BACKGROUND OF THE INVENTION

The grass collecting container with the two section construction where only the rear container section is pivoted upwardly has an advantage over a type where the entire collector is swung upward in that the former has a smaller weight to pivot up. However, the collecting capacity of the fixed front container section is limited.

That is, a front container section has the bottom portion which is sloped, which leaves the front container section with a small capacity.

SUMMARY OF THE INVENTION

The present invention was made in light of the issues mentioned above. An object of the invention is to provide a grass collector having advantages of the two section structure without sacrificing the collecting volume.

To attain the object of the invention, the grass collector adapted to be attached to a rear of a riding-type mower for receiving cut grass from a mower unit through a duct comprises a front container section having a rearwardly facing opening and adapted to be attached to the riding-type mower, the front container section carrying a first bottom plate having a substantially horizontal position; and a rear container section supported pivotably about a pivot point located in a rear upper region of the front container section and pivotable between a first position wherein the rear container section substantially covers the opening of the front container section and a second position pivoted from the first position to allow cut grass to fall, the rear container section having a second bottom plate having a substantially horizontal position.

Since the front container section has the first bottom plate having a substantially horizontal position, the invention provides a grass collector has a relatively large collecting volume.

DETAILED DESCRIPTION OF PREFERRED EMBODIMENTS

Figure 1:
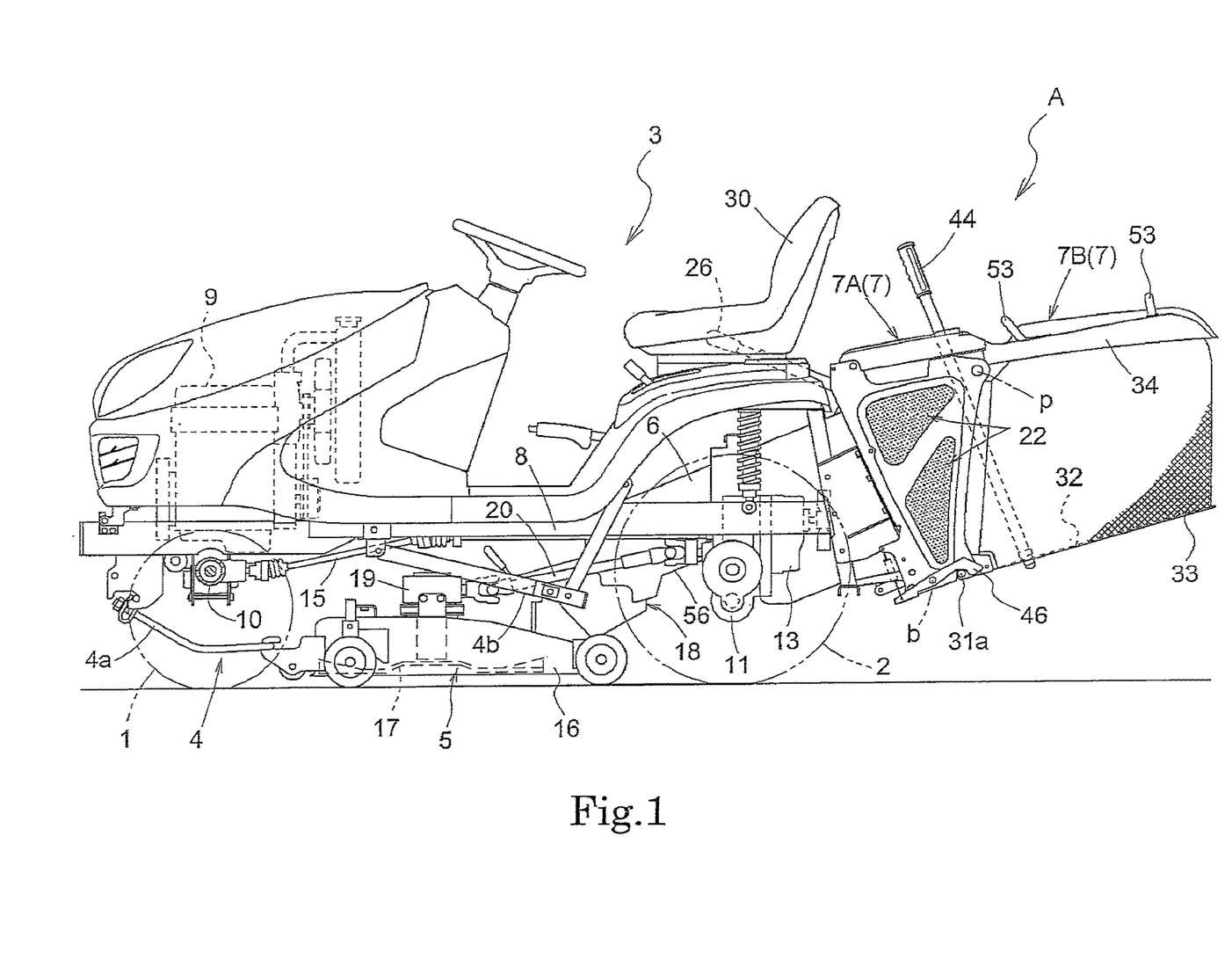
FIG. 1 is a side view of the entire mower tractor.
Figure 2:
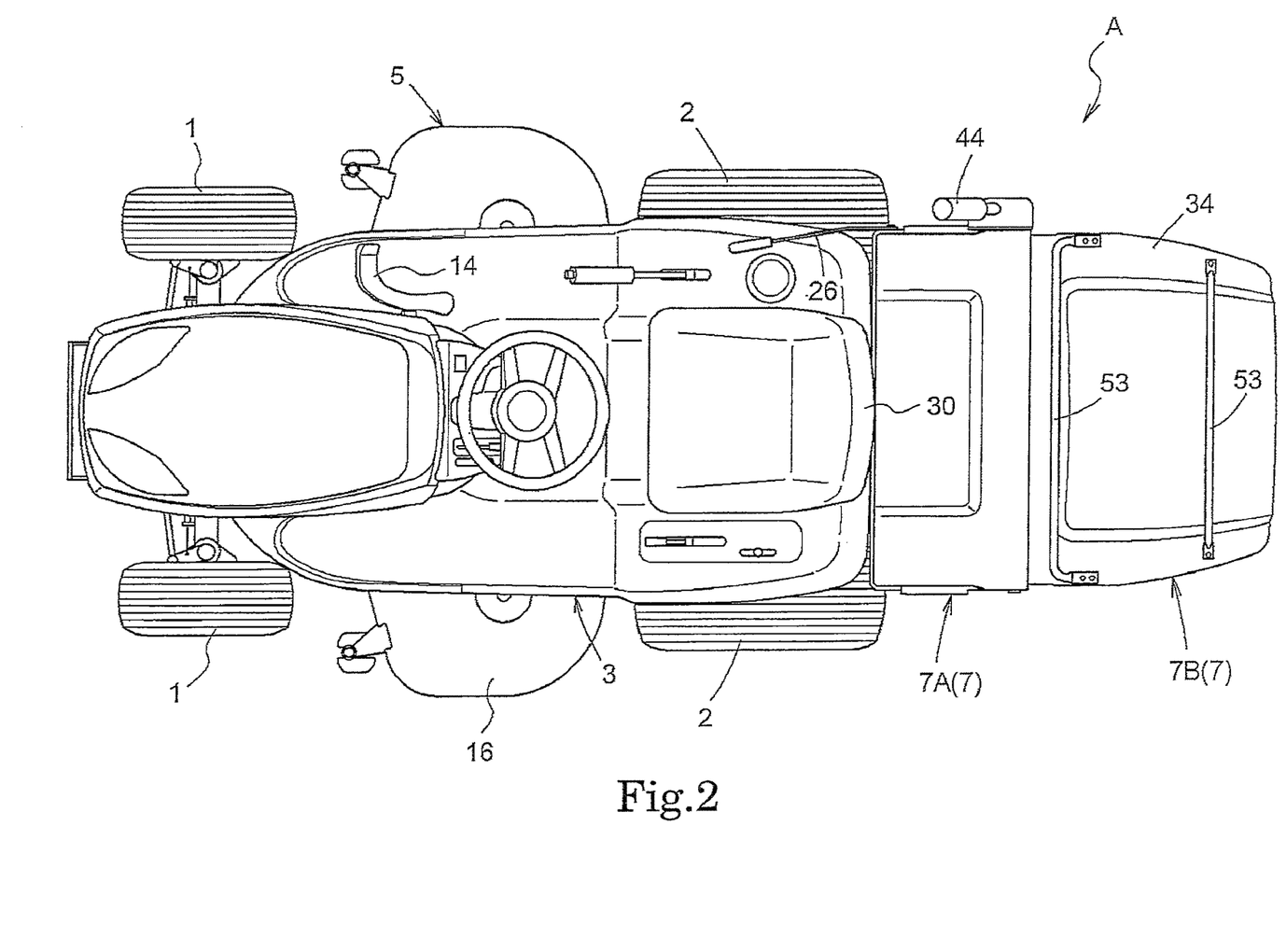
FIG. 2 is a plan view of the entire mower tractor.

The left lateral side view of the mower tractor with the grass collecting apparatus to which the present invention is directed is shown in FIG. 1 and its plan view is shown in FIG. 2. The mower unit 5 is arranged below the four-wheel-drive riding type vehicle 3 having the front wheels 1 and the rear wheels 2. The mower unit 5 is connected to the riding vehicle 3 vertically movably through the lift linkage mechanism 4 of the parallel linkage mechanism which consists of front links 4a and rear links 4b. The grass cut by the mower unit 5 is guided through the duct 6 to the rear of vehicle, and is collected with the grass collecting container 7. The grass collecting apparatus A which has the grass collecting container 7 is attached to the vehicle rear portion. The engine 9 is mounted to the front upper part of the main frame 8 of the vehicle 3. The front-axle case 10 which steerably supports the right and left front wheel 1 is connected to the front lower part of the main frame 8. The transmission ease 11 which supports the rear wheel 2 is connected to the rear portion of the main frame 8.

The power from an engine 9 is transmitted to a transmission case 11 with a shaft and is transmitted to the hydraulic continuously variable speed change device 13 connected to the rear face of the transmission case 11. The shift operation portion of the hydraulic continuously variable speed change device 13 is connected by a linkage to the speed change pedal 14 arranged at the feet area of the operator's station of the riding vehicle 3.

The continuous speed change in a forward travel is performed by a step in operation of the speed change pedal 14 in a forward direction, and the continuous speed change in a reverse travel is performed by a step in operation to the rearward direction of the speed change pedal 14. The gear change power of the hydraulic continuously variable speed change device 13 is input into a transmission case 11. Then, the power branches to two lines. One branched power is transmitted to the rear wheel 2. The other is transmitted to the front-axle case 10 through the power transmission shaft 15.

The mower unit 5 has three bar-shaped blades 17 driven through vertical axis at a center, right and left locations of a deck 16. The cut grass is joined by the wind generated by each bar blade 17, and is guided and sent out from the cut grass exhaust port 18 which protrudes in a tunnel manner in the lateral middle region on the top face of a rear portion in a deck 16.

The input case 19 is provided in the lateral center of a top face of a deck 16, and the operating power taken out from the front face of the transmission case 11 is transmitted to the input case 19 through the power transmission shaft 20. This power is transmitted to each blade 17 with a belt.

Figure 11:
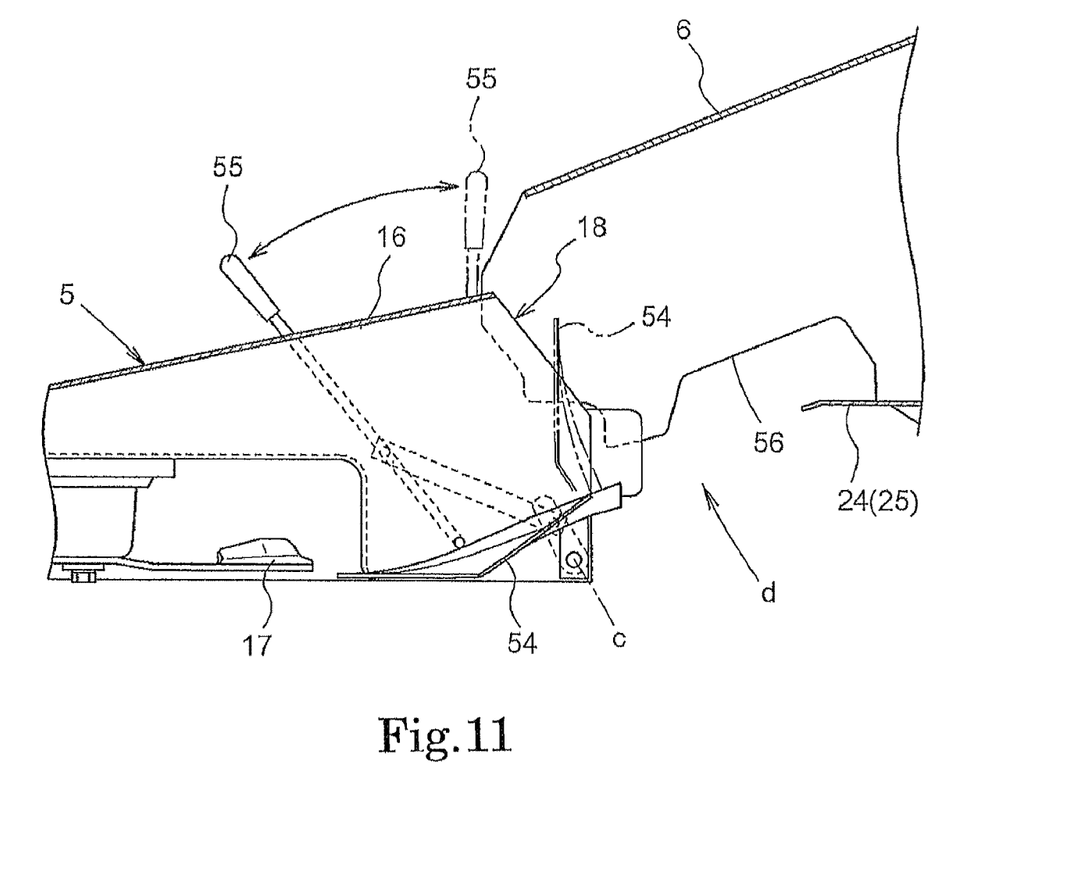
FIG. 11 is a vertical sectional side view showing the connection part of the mower and the duct.

As shown in FIG. 11, the duct 6 is fixedly connected to the vehicle lower part. The duct 6 is formed in the shape of a tunnel which opens downwardly. The front part of the duct 6 is connected to the cut grass exhaust port 18 such that the connection permits lifting movements of the mower unit 5. The back end of the duct 6 extends to and in communication with the front face of the grass collecting container 7. In addition, the cut grass sent out with sufficient velocity towards the back upper part from the mower unit 5 flows rearwardly along the ceiling areas of the cut grass exhaust port 18 and the duct 6.

Figure 3:
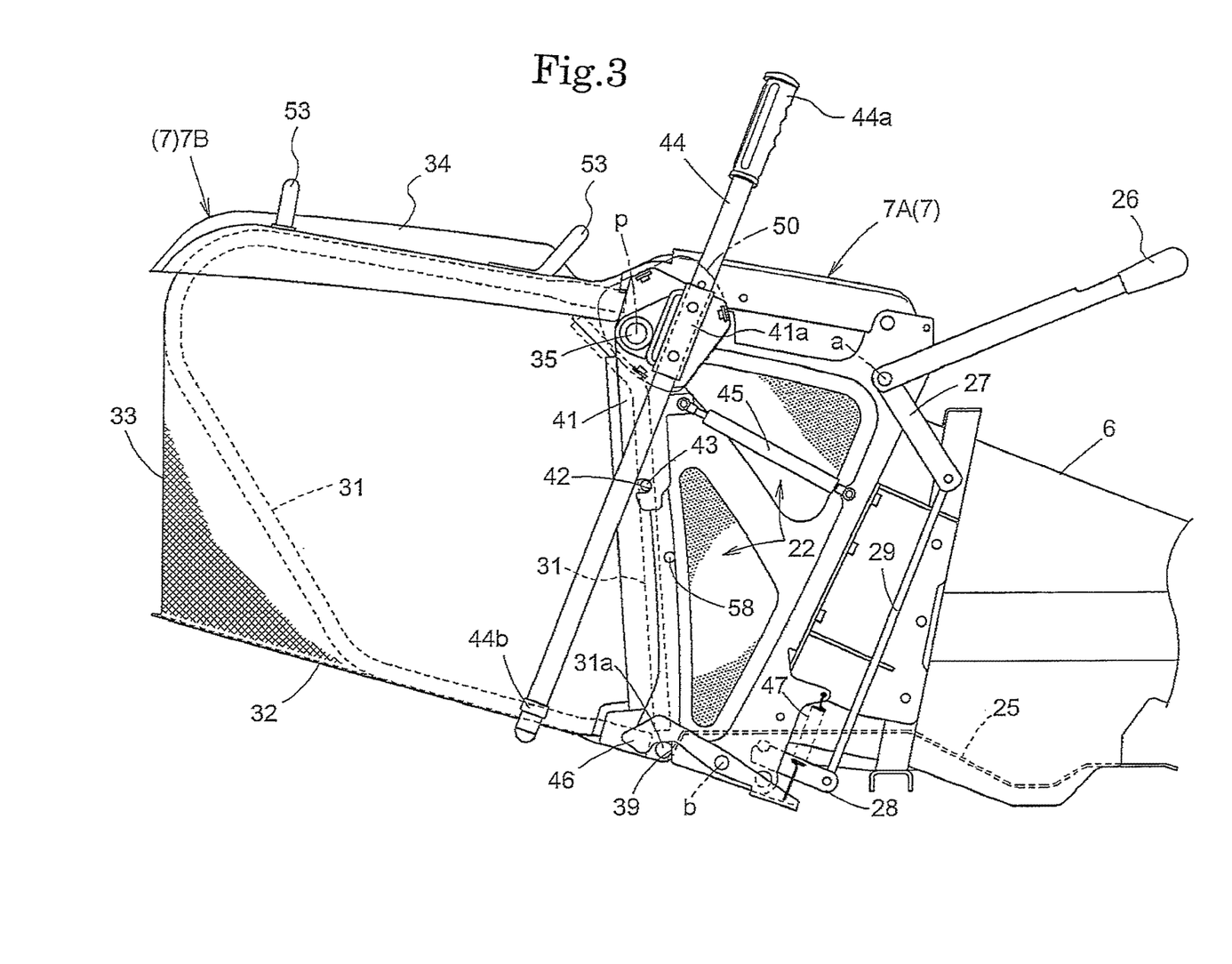
FIG. 3 is a right side view showing the grass collecting apparatus in its grass collecting state.

As shown in FIG. 3, the grass collecting container 7 has a divided configuration in the fore and aft direction having the front container section 7A and the rear container section 7B. The front container section 7A is fixedly connected to the rear end part of the main frame 8. The rear container section 7B is vertically pivotably connected to the front container section 7A about the pivot point p extending in a transverse direction at a location near the top back end of the front container section 7A.

Figure 8:
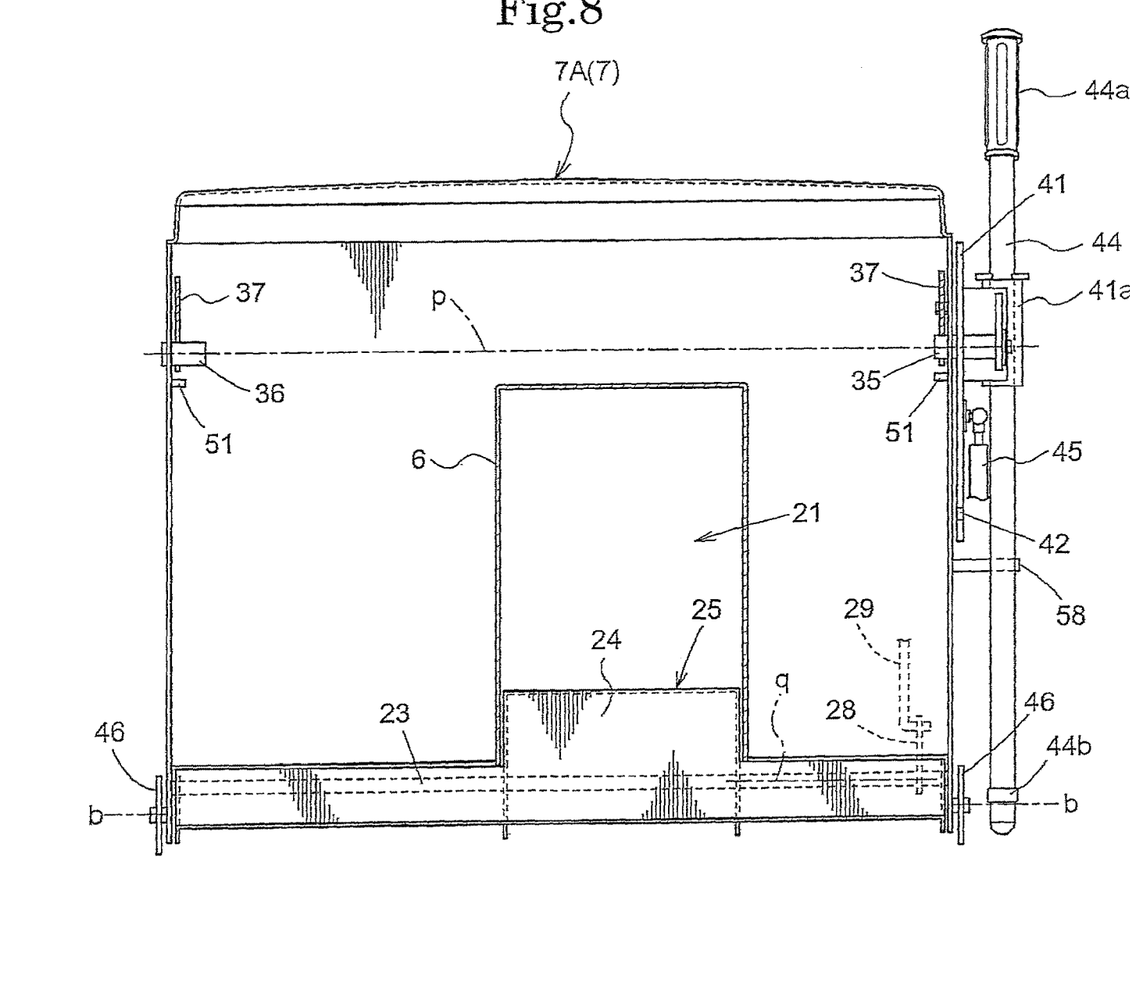
FIG. 8 is a vertical section back view of a grass collecting apparatus.
Figure 9:
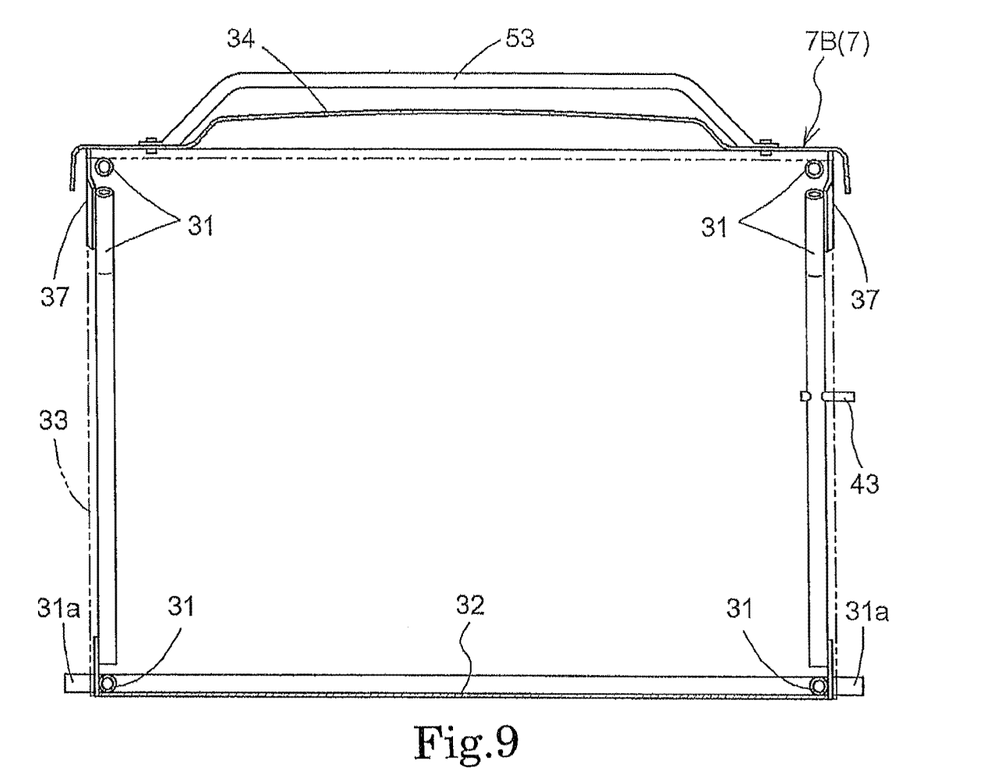
FIG. 9 is a vertical section back view of a grass collecting container.
Figure 10:
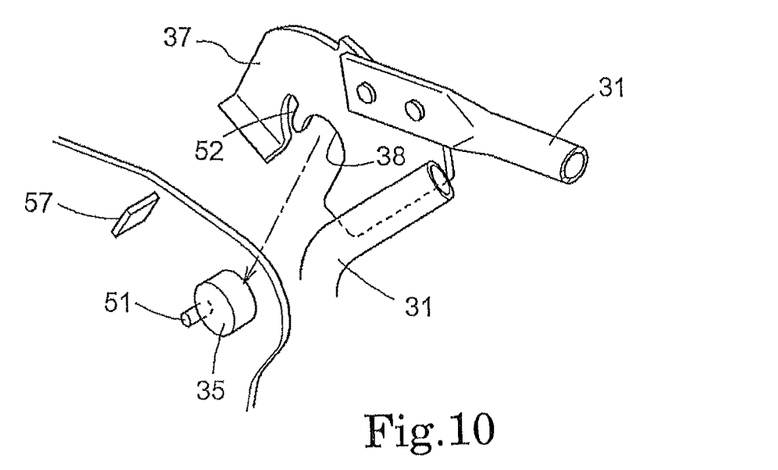
FIG. 10 is an exploded perspective view of a grass collecting container coupling portion.

As shown in FIG. 8, the front container section 7A is made with sheet metal, has an opening that opens rearwardly, and generally has an approximate box-shape. A cut grass entrance opening 21 of a rectangular shape, though which the rear end part of the duct 6 communicates with the collector 7, is formed in the central lower part of the front wall surface of the front container section 7A. The ventilation portions 22 with the sheet steel with a large number of small hole punched through or metal netting are formed on the right and left side wall surface of the front container section 7A. Since the air flow blown in from the cut grass entrance opening 21 escapes from the ventilation portions 22, right and left areas of the front container section 7A are filled up with cut grass.

The rear bottom plate 23 that is broad in a lateral direction but short in the fore and aft direction forming the base of the front container section 7A, and the laterally narrow but long bottom plate 24 forming a base of the duct 6 is formed as one piece sheet steel bottom plate member 25 of a flat configuration having a T-shape. This bottom plate member 25 is supported pivotally to a lower portion of the front container section 7A about a pivot q that extends laterally in the front end region of the bottom plate 23 of the front container section 7A. This bottom plate member 25 can be pivoted between a grass collecting position which is substantially horizontal in the fore and aft direction, and the ejecting position in which the front part of the bottom plate member 25 is inclined upwardly.

Figure 6:
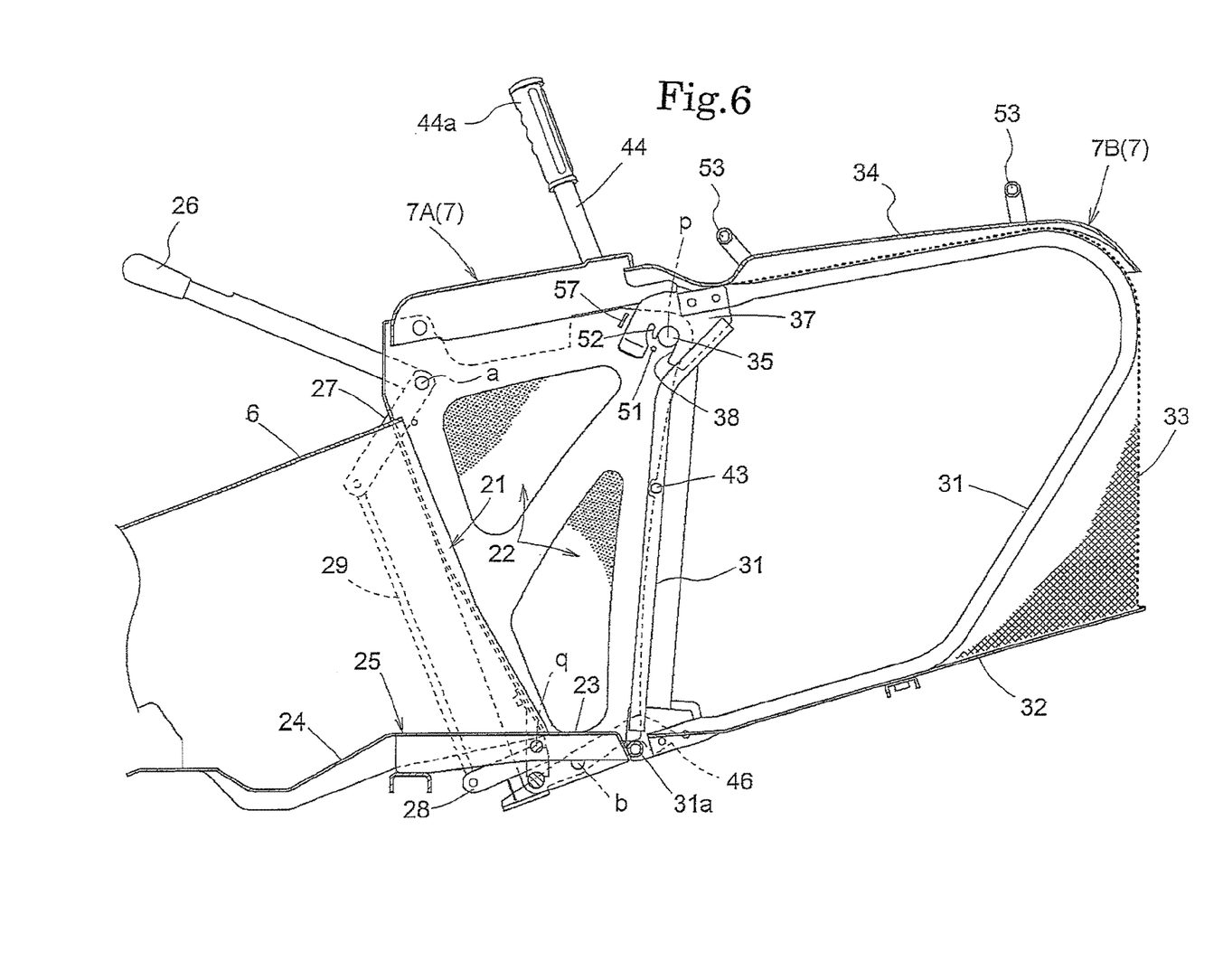
FIG. 6 is a vertical sectional side view showing the grass collecting apparatus in its grass collecting state.

As shown in FIG. 6, when the bottom plate member 25 is in the grass collecting position, the back end of the bottom plate 23 approaches the base front end of the rear container section 7B. And the front bottom plate 24 is located along the lower part of the duct 6 forming one long base covering the grass collecting container 7 from a duct rear portion.

Figure 7:
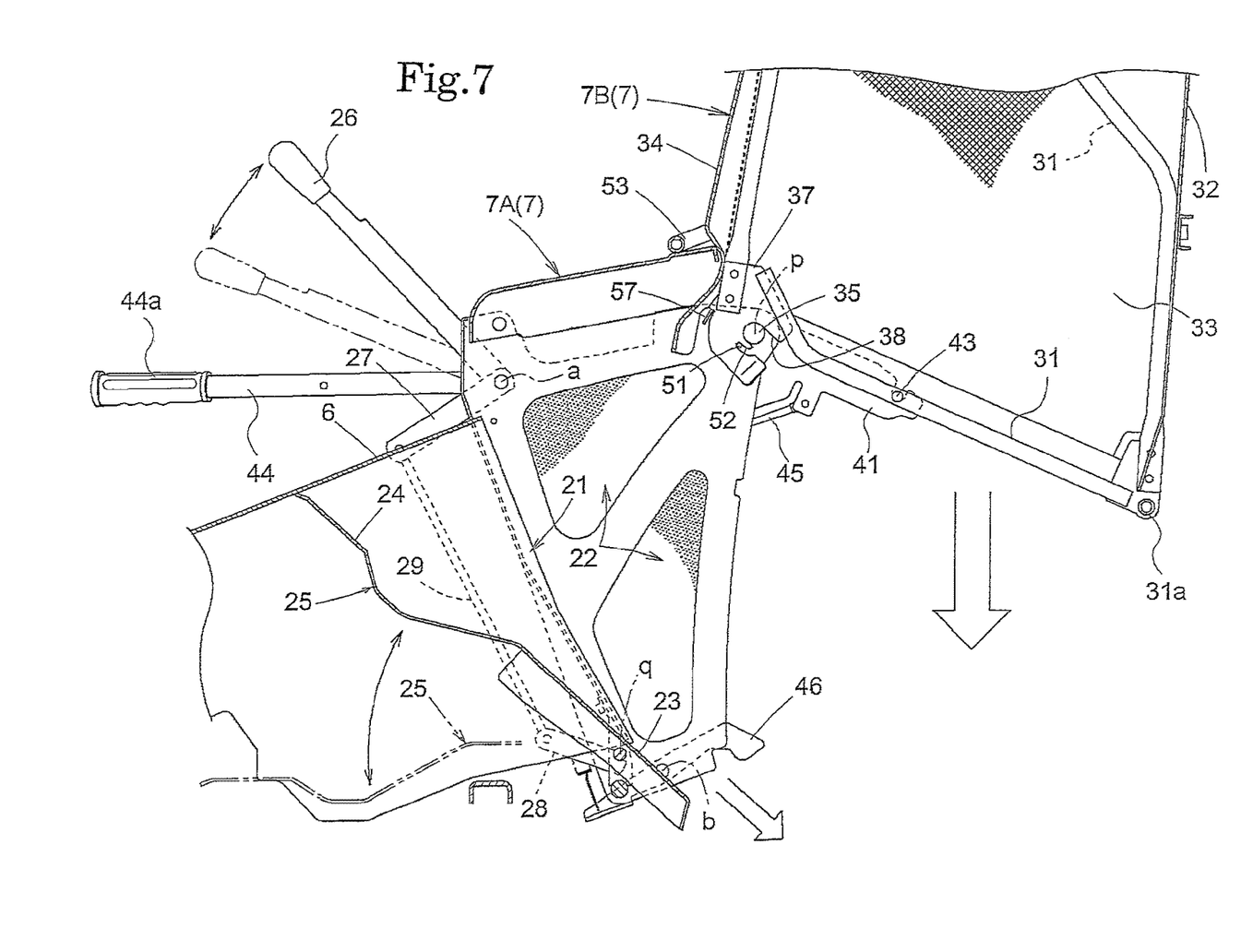
FIG. 7 is a vertical sectional side view showing the grass collecting apparatus in its ejection state.

When the bottom plate member 25 moves to the ejecting position as shown in FIG. 7, the front bottom plate 24 is pivoted up to the top of a duct 6 within the duct 6, the rear bottom plate 23 is pivoted to a steep inclined position such that its rear portion is lower than its front portion. The right outer surface in the front container section 7A has the control lever 26 which can be pivoted about the pivot point a.

The operation arm 27 that pivots with the control lever 26, and the operating arm 28 pivots with the bottom plate member 25 are operatively connected through the rod 29. The control lever 26 extends to the right side of the operator's seat 30 of the vehicle 3, and the operator who sits in the operator's seat 30 can vertically swing the bottom plate member 25 by pivoting the control lever 26.

The rear container section 7B is explained next with reference to FIG. 6. The steel sheet bottom plate 32 is connected to the underside of the support frame 31. The sheet material 33 of woven resin or cloth with appropriate mesh size is fixed on the upper wall side, right and left side wall surfaces, and the back wall side of the rear container section 7B.

The rear container section 7B has the box-like configuration having an opening which opens generally toward the front. The support frame 31 is formed by assembling a metal round pipe material to a box-shape. The upper cover 34 is arranged, with a suitable space, above the upper part of the rear container section 7B. This allows the wind blown in with cut grass from the cut grass entrance slot 21 to escape from the upper wall side, lateral side wall surfaces, and a back wall side with air-permeable sheet material 34. The wind which passed through the upper wall side is guided by the upper cover 34, and flows towards a lower part from the upper part of a back wall side.

The rear container section 7B is supported detachably, and vertically pivotably about the pivot point p, to the front container section 7A.

The structures for allowing a pivoting, an attachment and detachment are explained next.

As shown in FIG. 8, the pivot shaft 35 which is the pivot point p of the rear container section 7B penetrates and is fixed in the rear upper part of the right side wall of the front container section 7A in a lateral direction. A pivot shaft 36 projects inwardly, and concentrically with said pivot shaft 35, at the location above a rear portion of the left-hand side wall of the front container section 7A. Connecting fittings 37 are fixed to the right and left front and upper positions of the support frame 31 in the rear container section 7B, respectively. The engaging recess 38 formed in each connecting fitting 37 engages from above with the inwardly projecting parts of the right-hand side pivot shaft 35, and the left-hand side pivot shaft 36 respectively.

The rear container section 7B is supported to and vertically pivotably about the pivot shafts 35 and 36 (pivot point p) with the section 7B fixed in the lateral direction. The positioning pins 31a are formed in the front end lower part of the rear container section 7B by extending the lateral ends of the support frame 31 to the outward directions. The steps 39 are formed in the lower part of the back ends of the lateral side wall surfaces in the front container section 7A to abut and catch the positioning pins 31a.

The front opening end of the rear container section 7B is connected in a proper grass collecting position to the back opening end of the front container section 7A proper due to the steps 39 abutting and catching the positioning pins 31a. The operation arm 41 pivotably supported by the outward projection of said pivot shaft 35 is arranged on the outside of the right side wall in the front container section 7A. The rearwardly facing engaging recess 42 is formed in the free end portion of this operation arm 41. The engaging pin 43 protrudes laterally on the right front end part of the support frame 31 in the rear container section 7B and is releasably engageable with the engaging recess 42 of the operation arm 41. The operation arm 41 has the control lever 44.

Figure 4:
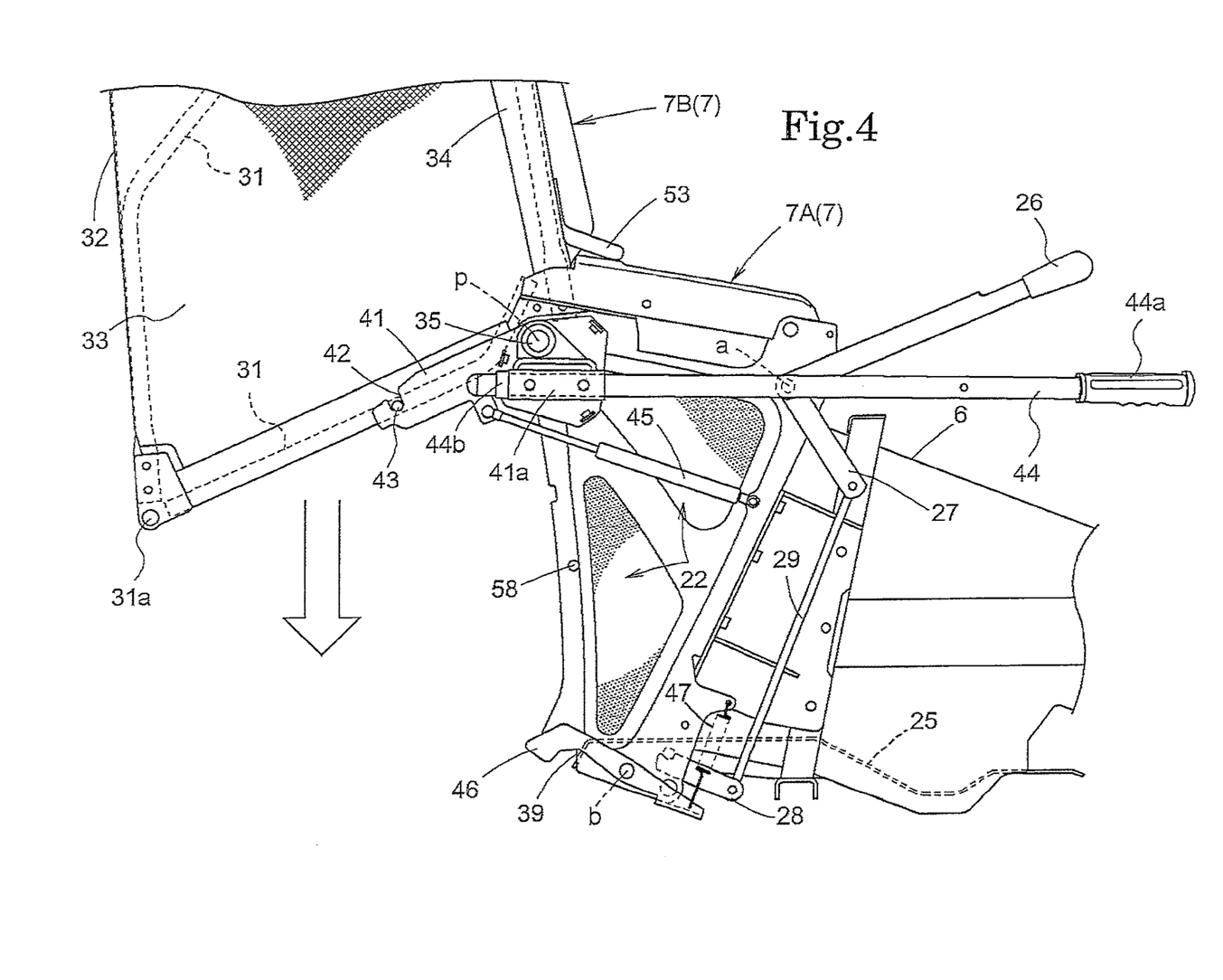
FIG. 4 is a right side view showing the grass collecting apparatus in its ejection state.
Figure 5:
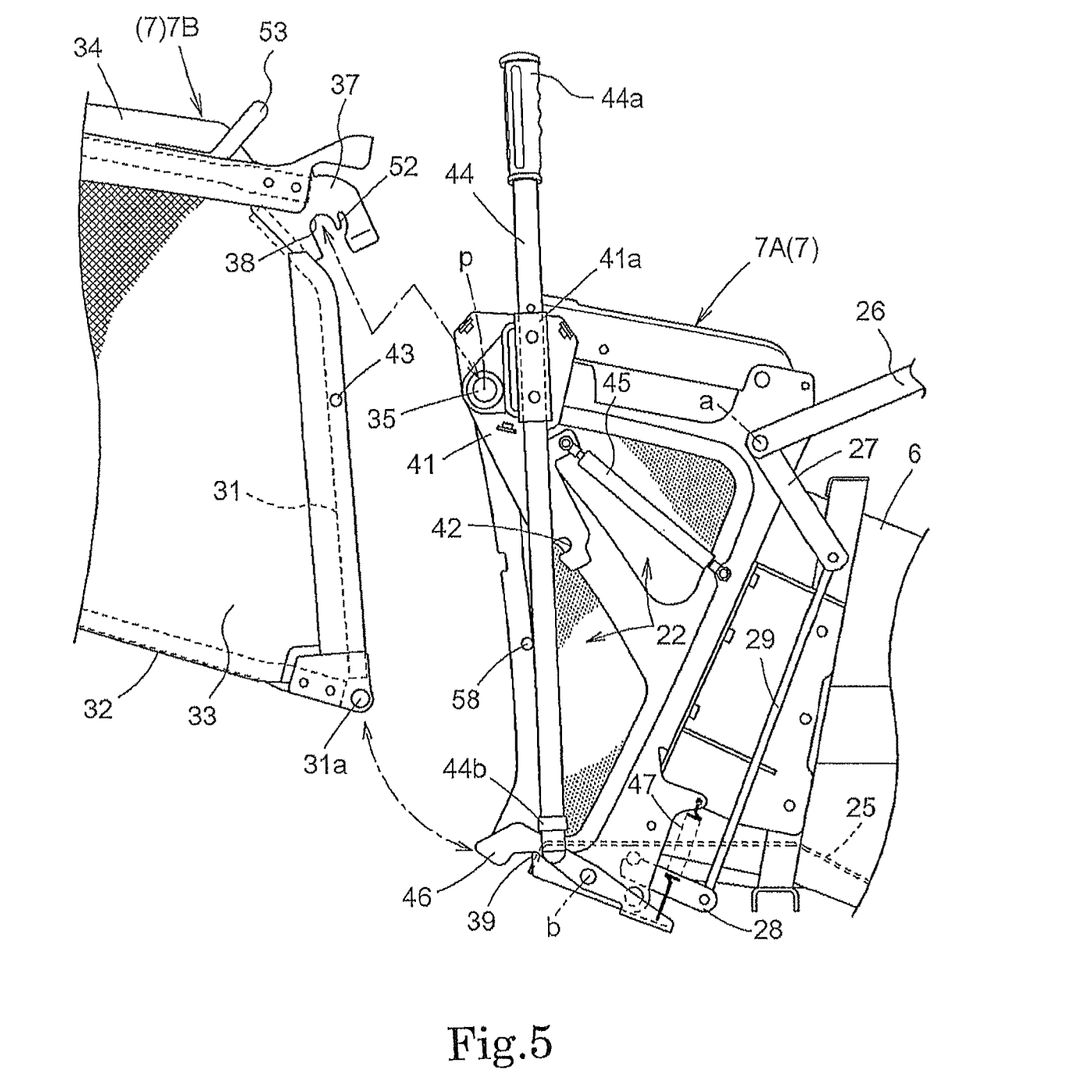
FIG. 5 is a side view of a grass collecting container where respective sections are separated.

As shown in FIG. 4, by pivoting the control lever 44 forwardly, and swinging up the operation arm 41 rearwardly, the rear container section 7B, which engages with the operation arm 41 through the engaging recess 42 and the engaging pin 43, is pivoted downwardly to its ejection position with its opening facing downwardly. A gas spring 45 which urges the operation arm 41 upwardly is arranged between the operation arm 41 and the front container section 7A to reduce the force required to operate the control lever 44. The control lever 44 is supported to operation arm 41 such that the control lever 44 can be extended and contracted with respect to the operation arm 41. That is, the boss section 41a extending in the vertically direction is fixed to the outside of the operation arm 41, and the control lever 44 is held in it such that it can slide substantially vertically in this boss section 41a. The control lever 44, in a free state, slides to a lower limit point on its own weight. In this contracted position, the grip part 44a of the control lever 44 is in a location lower than the backrest top end of the operator's seat 15, and is held at the height which does not pose as an obstacle for vehicle control or for watching the rear.

When discharging the collected cut grass by pivoting the rear container sections 7B, the control lever 44 is slid up so that the grip part 44a moves to a location higher than the backrest top end of the operator's seat 30. The stopper pin 44b provided in the upper part of the control lever 44 is caught by the upper end of the boss section 41a, to restrict the downward slide of the control lever 44. The upward slide of the control lever 44 is restricted by the large diameter stopper pin 44b provided in the lower-end portion of the control lever 44 abutting the lower end of the boss section 41a.

The base and the boss section 41a of said operation arm 41 are covered with a covering 50.

As shown in FIG. 7, when the collected cut grass is discharged by pivoting the rear container section 7B upwardly, the front container section 7A is opened rearwardly by the pivoting of the rear container section 7B, and much of the cut grass in the front container section 7A is discharged. However, cut grass collected in the rear portion of the duct 6 and the cut grass collected on the bottom of the front container section 7A remain. By operating the control lever 26 to switch the bottom plate member 25 to the ejecting position where its front portion is lifted and inclined to an angle, cut grass collected on the rear portion of a duct 6 and cut grass collected on the bottom of the front container section 7A can be discharged.

The hook member 46 which engages with said positioning pin part 31a of the rear container section 7B from above in the grass collecting position is provided in the front end lower part of the front container section 7A. This hook member 46 pivotably supported in the vertical direction about the pivot point b, and is urged by the spring 47 in the engaging direction. This prevents an unintentional pivoting of the rear container section 7B and formation of a gap between the front container section 7A and the rear container section 7B due to the vehicle bounce during travel when the rear container section 7B is pivoted into a grass collecting position to collect cut grass. Thus this prevents the collected cut grass from falling.

However, the hook shape and the strength of the spring 47 are set so that, as the hook member 46 is pushed by the positioning pin part 31a of the rear container section 7B, it pivots rearwardly against the spring 47 when operating the control lever 44 to pivot the rear container section 7B intentionally.

The lateral inner surface in the front container section 7A has the restraint pin 51 and the restraint projection 57 both extending inwardly at locations distant from the pivot shafts 35 and 36.

The guide groove 52 which is in the shape of arc centering on the pivot point p and which is continuous with said engaging recess 38 is formed in the connecting fitting 37 of the rear container section 7B.

As shown in FIG. 6, when the rear container section 7B is pivoted downwardly and is in the grass collecting position, the restraint pin 51 is out of the guide groove 52. In this state, by raising the rear container section 7B up, and removing the connecting fittings 37 from the pivot shafts 35 and 36, the rear container section 7B can be removed from the front container section 7A. As the rear container section 7B is swung up from its grass collecting position as shown in FIG. 7, the restraint pin 51 is engaged by the guide groove 52 and the restraint projection 57 approaches the front side of the connecting fitting 37. Therefore, it becomes impossible to move the connecting fitting 37 upwardly and forwardly with respect to the pivot shafts 35 and 36. That is, the attachment-and-detachment restraint structure is provided that permits an attachment and detachment of the rear container section 7B only when the rear container section 7B is pivoted downwardly and in the low grass collecting position.

In addition, the handles 53 connected with the support frame 31 at a forward and a rearward location of the top face in the rear container section 7B are provided and are used for attachment and detachment of the rear container section 7B. Before removal of the rear container section 7B, and after operating the extended control lever 44 rearwardly against the gas spring 45, the shortened control lever 44 is engaged with the pin 58 which protrudes on the side face of the front container section 7A, and the operation arm 41 is held in the location separated from the engaging pin 43. Thus, by fixing the control lever 44, the operation arm 41, now free of the weight of the rear container section 7B, is prevented from pivoting upwardly by the gas spring 45.

As shown in FIG. 11, the bottom plate 54 which forms the base of the cut grass exhaust port 18 is provided in the back lower part of the deck 16 of the mower unit 5. This bottom plate 54 is vertically pivotable about the pivot point c and can be manually pivoted by the control lever 55. When cut grass clogs the cut grass exhaust port 18 or near a connection with a duct 6, cut grass can be discharged by pivoting the bottom plate 54 from the space d formed between this bottom plate 54 and the bottom plate 24 of a duct 6. When a large amount of cut grass is clogged, it becomes difficult to move the bottom plate 54. The cut out portion 56 is formed in the side front part of a duct 6 to lower the height of the duct 6 in this area so that some cut grass pushed by the pivoting of the bottom plate 54 is forced out from the cut out portion 56 which facilitates removal of the clog. Therefore, the bottom plate 54 can be pivoted by a greater degree by pivoting the bottom plate 54 several times. Therefore, clogged cut grass can all be discharged from Cavity d.

Other Embodiments (1) the control lever 26 is used as mentioned above as an operator manipulated implement for pivoting said bottom plate member 25. An operating pedal may also be used that can be operated by an operator in the operator's seat 15.

(2) It is also possible to form the bottom plate 23 of the front container section 7A, separate from the bottom plate 24 of a duct 6 so that they may be pivoted vertically independently.

In this case, it is possible to locate a pivot point for the bottom plate 23 of the front container section 7A in its rear end region so that it is tilted up in its ejecting position. This would increase the drop height between the bottom of the front container section 7A and the ground when ejecting the cut grass.

(3) The bottom plate member 25 can also be operatively connected to the operation arm 41 so that an upward pivoting actuation of the rear container section 7B pivots the bottom plate member 25 into its ejecting position.

(4) When the capacity of the grass collecting container 7 is large, said operation arm 41 may be moved with actuators, such as an hydraulic cylinder or an electric cylinder.

What is claimed is:

1. A grass collector adapted to be attached to a rear of a riding mower for receiving cut grass from a mower unit through a duct, the grass collector comprising:
   a front container section having a rearwardly facing opening and adapted to be attached to the riding mower, the front container section carrying a first bottom plate having a substantially horizontal position;
a rear container section supported pivotally about a pivot point located in a rear upper region of the front container section and pivotal between a first position wherein the rear container section substantially covers the opening of the front container section and a second position pivoted from the first position to allow cut grass to fall, the rear container section having a second bottom plate having a substantially horizontal position, wherein a grass collecting volume of the rear container section is greater than a grass collecting volume of the front container section, and
an operating device for pivotally operating the rear container section between the first position and the second position, comprising:
a control lever pivotally supported to an upper portion of the front container section, wherein the control lever is slideably mounted within the upper portion such that in a retracted position most of the control lever is below the pivot point and in an extended position most of the control lever is above the pivot point, thereby in the extended position maximizing the leverage available to move the rear container section from the first position to the second position;
an operation arm pivotal in unison with the control lever and connected to the rear container section to be relatively pivotal, the operation arm having an engaging recess; and
an engaging pin provided in the rear container section to engage with the engaging recess when the rear container section is pivotally operated by the control lever.

2. The grass collector according to claim 1, wherein the control lever extends substantially vertically in the first position where the engaging recess is engaged with the engaging pin, and extends substantially horizontally in the second position where the engaging recess is engaged with the engaging pin.

3. The grass collector according to claim 1, wherein the operating device is provided in one side surface of the front container section and the rear container section.

4. The grass collector according to claim 1, wherein the rear container section is adapted to release the relative pivotal connection with the operation arm, whereby the rear container section is removable from the front container section.

5. The grass collector according to claim 1, wherein the operation arm is urged by elastic urging means in a direction to pivotally operate the rear container section to the second position.

6. The grass collector according to claim 1, wherein the first bottom plate of the front container section is supported pivotally about a pivot point between a grass collecting position capable of holding cut grass and a slanted ejecting position.

7. The grass collector according to claim 1, wherein the first bottom plate of the front container section is generally T-shaped with a portion forming a part of a bottom of the duct and a further portion forming a bottom of the front container section.

8. A riding mower comprising a grass collector adapted to be attached rearwardly of a driver's seat for receiving cut grass from a mower unit through a duct, the riding mower further comprising:
a front container section having a rearwardly facing opening, the front container section carrying a first bottom plate having a substantially horizontal position;
a rear container section supported pivotally about a pivot point located in a rear upper region of the front container section and pivotal between a first position wherein the rear container section substantially covers the opening of the front container section and a second position pivoted from the first position to allow cut grass to fall, the rear container section having a second bottom plate having a substantially horizontal position, wherein a grass collecting volume of the rear container section is greater than a grass collecting volume of the front container section, and
an operating device pivotally operated between the first position and the second position, comprising:
a control lever pivotally supported to an upper portion of the front container section, wherein the control lever is slideably mounted within the upper portion such that in a retracted position most of the control lever is below the pivot point and in an extended position most of the control lever is above the pivot point, thereby in the extended position maximizing the leverage available to move the rear container from the first position to the second position;
an operation arm pivotal in unison with the control lever and connected to the rear container section to be relatively pivotal, the operation arm having an engaging recess;
an engaging pin provided in the rear container section to engage with the engaging recess when the control lever is pivotally operated; and
wherein the operating control lever is operable from the driver's seat.

9. A grass collector adapted to be attached to a rear of a riding mower for receiving cut grass from a mower unit through a duct, the grass collector comprising:
a front container section having a rearwardly facing opening and adapted to be attached to the riding mower, the front container section carrying a first bottom plate having a substantially horizontal position;
a rear container section supported pivotally about a pivot point located in a rear upper region of the front container section and pivotal between a first position wherein the rear container section substantially covers the opening of the front container section and a second position pivoted from the first position to allow cut grass to fall, the rear container section having a second bottom plate having a substantially horizontal position, wherein a grass collecting volume of the rear container section is greater than a grass collecting volume of the front container section, and
an operating device for pivotally operating the rear container section between the first position and the second position, comprising:
a control lever pivotally supported to an upper portion of the front container section;
an operation arm pivotal in unison with the control lever and connected to the rear container section to be relatively pivotal, the operation arm having an engaging recess;
an engaging pin provided in the rear container section to engage with the engaging recess when the rear container section is pivotally operated by the control lever; and
wherein the first bottom plate of the front container section is generally T-shaped with a portion forming a part of a bottom of the duct and a further portion forming a bottom of the front container section.

* * * * *

UNITED STATES PATENT AND TRADEMARK OFFICE
CERTIFICATE OF CORRECTION

| | | |
|---|---|---|
| PATENT NO. | : 7,905,080 B2 | |
| APPLICATION NO. | : 12/493327 | |
| DATED | : March 15, 2011 | |
| INVENTOR(S) | : Katsuhiko Uemura | |

It is certified that error appears in the above-identified patent and that said Letters Patent is hereby corrected as shown below:

IN THE CLAIMS:

Column 8, line 28, Claim 8, "wherein the operating control lever" should read
-- wherein the control lever --

Signed and Sealed this
Seventeenth Day of May, 2011

David J. Kappos
*Director of the United States Patent and Trademark Office*